US010166832B2

(12) United States Patent
DeBruler (10) Patent No.: US 10,166,832 B2
(45) Date of Patent: Jan. 1, 2019

(54) PERFORMANCE-VARIABLE BUSHINGS AS WELL AS GAS SPRING AND DAMPER ASSEMBLIES INCLUDING SAME

(71) Applicant: Firestone Industrial Products Company, LLC, Indianapolis, IN (US)

(72) Inventor: Brian S. DeBruler, Noblesville, IN (US)

(73) Assignee: Firestone Industrial Products Company, LLC, Nashville, TN (US)

( * ) Notice: Subject to any disclaimer, the term of this patent is extended or adjusted under 35 U.S.C. 154(b) by 143 days.

(21) Appl. No.: 15/501,556

(22) PCT Filed: Jul. 31, 2015

(86) PCT No.: PCT/US2015/043178
§ 371 (c)(1),
(2) Date: Feb. 3, 2017

(87) PCT Pub. No.: WO2016/022424
PCT Pub. Date: Feb. 11, 2016

(65) Prior Publication Data
US 2017/0217275 A1    Aug. 3, 2017

Related U.S. Application Data

(60) Provisional application No. 62/032,981, filed on Aug. 4, 2014.

(51) Int. Cl.
*B60G 17/015*    (2006.01)
*B60G 15/12*    (2006.01)
(Continued)

(52) U.S. Cl.
CPC .......... *B60G 17/0155* (2013.01); *B60G 11/27* (2013.01); *B60G 15/12* (2013.01);
(Continued)

(58) Field of Classification Search
CPC .... B60G 17/0155; B60G 17/08; B60G 11/27; B60G 15/12
See application file for complete search history.

(56) References Cited

U.S. PATENT DOCUMENTS 5,180,145 A * 1/1993 Watanabe ............... F16F 9/103
                                                     188/267.1
5,251,928 A * 10/1993 Maeda .................... F16F 13/08
                                                     267/195
(Continued)

FOREIGN PATENT DOCUMENTS

| DE | 102010038222 | 4/2012 |
|---|---|---|
| DE | 102012012902 | 1/2013 |
| EP | 0784163 | 7/1997 |

OTHER PUBLICATIONS

International Search Report for corresponding PCT Application No. PCT/US2015/043178 dated Oct. 29, 2015.

*Primary Examiner* — Nicole T Verley
(74) *Attorney, Agent, or Firm* — Brian D. McAlhaney; Fay Sharpe LLP (57) ABSTRACT

A performance-variable bushing includes an inner support element and an outer support element. An elastomeric connecting element extends between and operatively connect the inner and outer support elements such that a substantially fluid-tight seal is formed therebetween. The elastomeric connecting element can be at least partially formed from one of an electrorheological elastomeric material and a magnetorheological elastomeric material. The performance-variable bushing includes a variation-inducing element operatively associated with the elastomeric connecting element and selectively operable to vary values of one or more physical properties of the elastomeric connecting element. The elastomeric connecting element is configured for use under a pre-load force from pressurized gas within a spring (Continued)

chamber of an associated gas spring and damper assembly. Gas spring and damper assemblies and suspension systems are also included.

17 Claims, 5 Drawing Sheets (51) Int. Cl.
*B60G 17/018* (2006.01)
*B60G 11/27* (2006.01)
*F16F 9/54* (2006.01)
*F16F 1/38* (2006.01)
*F16F 9/05* (2006.01)

(52) U.S. Cl.
CPC ........ *B60G 17/0182* (2013.01); *F16F 1/3835* (2013.01); *F16F 9/05* (2013.01); *F16F 9/54* (2013.01); *B60G 2206/40* (2013.01); *F16F 2224/025* (2013.01); *F16F 2224/045* (2013.01)

(56) References Cited

U.S. PATENT DOCUMENTS

| | | | |
|---|---|---|---|
| 5,449,150 A * | 9/1995 | Watanabe | B60G 15/12 188/267.1 |
| 5,492,312 A | 2/1996 | Carlson | |
| 6,007,061 A * | 12/1999 | Kammel | B60G 15/068 188/321.11 |
| 6,311,810 B1 * | 11/2001 | Hopkins | F16F 9/535 188/267.2 |
| 6,336,535 B1 * | 1/2002 | Lisenker | F16F 9/535 188/267 |
| 6,382,369 B1 * | 5/2002 | Lisenker | F16F 9/535 188/267 |
| 6,427,814 B1 * | 8/2002 | Miyamoto | B60G 15/067 188/321.11 |
| 6,764,066 B2 * | 7/2004 | Graeve | B60G 13/003 188/321.11 |
| 6,883,649 B2 * | 4/2005 | Lun | F16F 9/3242 188/267 |
| 6,974,003 B1 * | 12/2005 | Acker | F16F 9/096 188/297 |
| 7,303,056 B2 * | 12/2007 | Namuduri | B60G 17/0152 188/267.2 |
| 7,849,983 B2 * | 12/2010 | St. Clair | B60G 99/002 188/267.1 |
| 7,936,113 B2 * | 5/2011 | Namuduri | B60G 13/14 310/319 |
| 8,614,518 B2 * | 12/2013 | Li | B60G 17/019 290/1 R |
| 9,701,170 B2 * | 7/2017 | DeBruler | F16F 13/002 |
| 9,969,230 B2 * | 5/2018 | Isaac | B60G 13/003 |
| 2002/0130001 A1 * | 9/2002 | Lisenker | F16F 9/535 188/267.2 |
| 2007/0119671 A1 | 5/2007 | Quinn | |
| 2010/0109276 A1 * | 5/2010 | Marjoram | B60G 99/002 280/124.157 |

* cited by examiner

PERFORMANCE-VARIABLE BUSHINGS AS WELL AS GAS SPRING AND DAMPER ASSEMBLIES INCLUDING SAME

This application is the National Stage of International Application No. PCT/US2015/043178, filed on Jul. 31, 2015, which claims the benefit of priority from U.S. Provisional Patent Application No. 62/032,981 filed on Aug. 4, 2014, the subject matter of both are hereby incorporated herein by reference in their entireties.

BACKGROUND

The subject matter of the present disclosure broadly relates to the art of gas spring and damper devices and, more particularly, to performance-variable bushings that are dimensioned for securement between an end of a damper rod and an end member of a gas spring and damper assembly. Such performance-variable bushings can include an elastomeric connecting member that is at least partially formed from at least one of an electrorheological elastomeric material and a magnetorheological elastomeric material. In a preferred arrangement, such performance-variable bushings can be constructed for pre-loading associated with direct exposure to pressurized gas contained within a spring chamber of a gas spring and damper assembly. Gas spring and damper assemblies including such performance-variable bushings, and suspension systems can include one or more of such gas spring and damper assemblies are also included.

The subject matter of the present disclosure may find particular application and use in conjunction with components for suspension systems of wheeled vehicles, and will be shown and described herein with reference thereto. It is to be appreciated, however, that the subject matter of the present disclosure is also amenable to use in other applications and environments, and that the specific uses shown and described herein are merely exemplary. For example, the subject matter of the present disclosure could be used in connection with gas spring assemblies of non-wheeled vehicles, support structures, height adjusting systems and actuators associated with industrial machinery, components thereof and/or other such equipment. Accordingly, the subject matter of the present disclosure is not intended to be limited to use associated with gas spring suspension systems of wheeled vehicles.

Wheeled motor vehicles of most types and kinds include a sprung mass, such as a body or chassis, for example, and an unsprung mass, such as two or more axles or other wheel-engaging members, for example, with a suspension system disposed therebetween. Typically, a suspension system will include a plurality of spring devices as well as a plurality of damping devices that together permit the sprung and unsprung masses of the vehicle to move in a somewhat controlled manner relative to one another. Movement of the sprung and unsprung masses toward one another is normally referred to in the art as jounce motion while movement of the sprung and unsprung masses away from one another is commonly referred to in the art as rebound motion.

Gas spring and damper assemblies are well known and commonly used. Known gas spring and damper assemblies typically include a gas spring assembly and a damper (e.g., a hydraulic or fluid damper). The gas spring assembly can include opposing end members and a flexible bellows or sleeve secured therebetween to define a spring chamber suitable for containing a quantity of pressurized gas. The damper can include a damper housing and a damper piston located within the housing. A damper rod is connected to the damper piston and projects from the damper housing so that the damper piston and rod can undergo reciprocal motion relative to the damper housing.

In an assembled condition, the damper rod and damper housing extend into and through the gas spring assembly. Typically, the damper rod is connected to one of the end members of the gas spring assembly and the damper housing is connected to the other end member of the gas spring assembly. As such, forces and loads experienced during use of the gas spring and damper assembly can be transmitted between the end member and the damper rod by way of a damper rod bushing that is operatively disposed therebetween.

Conventional damper rod bushings of a wide variety of types, kinds and constructions have been developed to communicate forces and/or loads associated with the static and/or dynamic operation and use of a vehicle into, out of and/or otherwise between an end member of a gas spring assembly (or other vehicle component) and the damper rod. The static and dynamic inputs experienced by a vehicle suspension system can vary widely. For example, a vehicle suspension may experience relatively low frequency (e.g., 1-4 Hz) and higher amplitude inputs, medium frequency (8-12 Hz) and moderate amplitude inputs as well as higher frequency (e.g., 15-25 Hz) and comparatively lower amplitude inputs during use in operation. Conventional damper rod bushings are constructed to withstand forces and loads associated with all of such static and dynamic inputs. As such, some compromise with respect to the performance of conventional damper rod bushings typically results.

Notwithstanding the common usage and overall success of conventional designs, it is believed that a need exists to meet these competing and/or other goals while still retaining comparable or improved performance, ease of manufacture, ease of assembly, ease of installation, reduced cost of manufacture and/or otherwise advancing the art of gas spring and damper devices.

BRIEF SUMMARY

One example of a performance-variable bushing in accordance with the subject matter of the present disclosure can include an inner support element and an outer support element. The inner support element can include an element wall with an inside surface at least partially defining a passage through the inner support element. A flange wall portion can extend outwardly from along the element wall toward an outer peripheral edge. The outer support element can be spaced radially outward and coextensive with at least a portion of the inner support element. An elastomeric connecting element can extend between and operatively connect the inner and outer support elements such that a substantially fluid-tight seal is formed therebetween. The elastomeric connecting element can be at least partially formed from one of an electrorheological elastomeric material and a magnetorheological elastomeric material. The performance-variable bushing can include a variation-inducing element operatively associated with the elastomeric connecting element and selectively operable to vary values of one or more physical properties (e.g., material rigidity or stiffness) within predetermined ranges of values corresponding to the one or more physical properties. In a preferred arrangement, the elastomeric connecting element can be configured for use under a pre-load force from pressurized gas within a spring chamber of an associated gas spring and damper assembly.

One example of a gas spring and damper assembly in accordance with the subject matter of the present disclosure can include a first end member and a second end member that is disposed in spaced relation to the first end member such that a longitudinal axis extends therebetween. A flexible spring member can include a flexible wall that extends longitudinally between opposing first and second ends. The first end can be operatively attached to the first end member such that a substantially fluid-tight seal is formed therebetween. The second end can be operatively attached to the second end member such that a substantially fluid-tight seal is formed therebetween. The flexible spring member and first and second end members can at least partially define a spring chamber. A damper can include a damper housing and a damper rod operatively connected with the damper housing such that the damper can generate reciprocal damping motion between the damper housing and the damper rod. A performance-variable bushing can be operatively connected between the damper rod and the first end member such that forces acting on one of the damper rod and the first end member are transmitted or otherwise communicated through the performance-variable bushing to the other of the damper rod and the first end member. The performance-variable bushing can be at least partially formed from one of an electrorheological elastomeric material and a magnetorheological elastomeric material that includes one or more physical properties (e.g., material rigidity or stiffness) that are variable under the influence of a corresponding one of an electric field and a magnetic field. In a preferred arrangement, the performance-variable bushing can be disposed in fluid communication with the spring chamber such that pre-load forces due to gas pressure within the spring chamber act on the performance-variable bushing. The damper housing can be operatively connected with the second end member.

One example of a suspension system in accordance with the subject matter of the present disclosure can include a pressurized gas system and at least one gas spring and damper assembly in accordance with the foregoing paragraph. The spring chamber of the at least one gas spring and damper assembly can be disposed in fluid communication with the pressurized gas system such that pressurized gas can be transferred into and out of the spring chamber.

In some cases, a suspension system in accordance with the subject matter of the present disclosure can include a control system with a controller communicatively coupled with one or more components of the pressurized gas system for selective operation thereof. Additionally, or in the alternative, such a control system can include a controller and one or more variation-inducing elements communicatively coupled with the controller for selective operation thereof. Such one or more variation-inducing elements can be cooperatively associated with the performance-variable bushing and selectively operable to vary values of one or more physical properties (e.g., material rigidity or stiffness) of an elastomeric material of the bushing within predetermined ranges of values corresponding to the one or more physical properties.

DETAILED DESCRIPTION

Turning now to the drawings, it is to be understood that the showings are for purposes of illustrating examples of the subject matter of the present disclosure and are not intended to be limiting. Additionally, it will be appreciated that the drawings are not to scale and that portions of certain features and/or elements may be exaggerated for purposes of clarity and/or ease of understanding.

Figure 1:
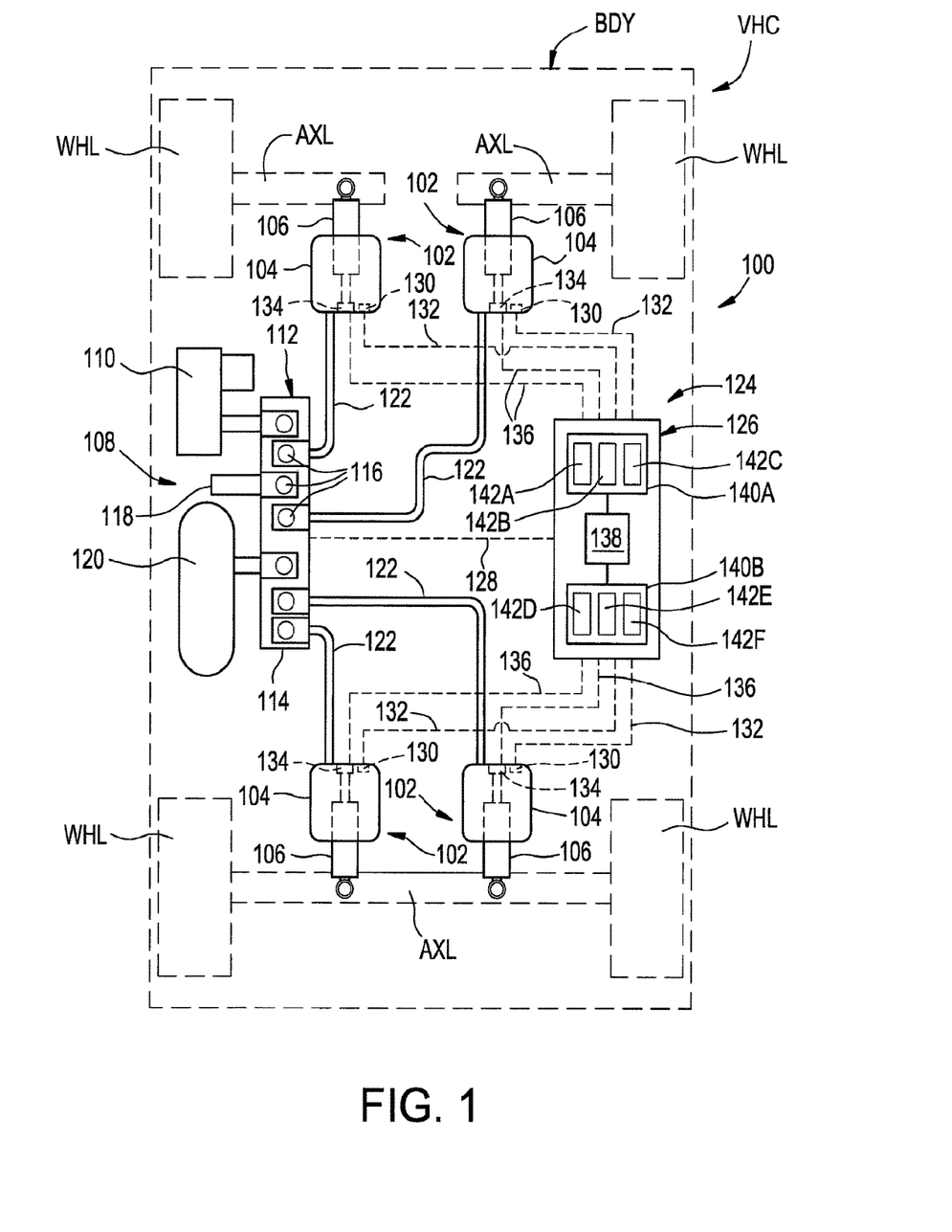
FIG. 1 is a schematic representation of one example of a suspension system of an associated vehicle including at least one gas spring and damper assembly in accordance with the subject matter of the present disclosure.

FIG. 1 illustrates one example of a suspension system 100 disposed between a sprung mass, such as an associated vehicle body BDY, for example, and an unsprung mass, such as an associated wheel WHL or an associated axle AXL, for example, of an associated vehicle VHC. It will be appreciated that any one or more of the components of the suspension system can be operatively connected between the sprung and unsprung masses of the associated vehicle in any suitable manner.

The suspension system can include any combination spring and damper devices operatively disposed between the sprung and unsprung masses of the associated vehicle. For example, a suspension system can include one or more gas spring and damper assemblies in accordance with the subject matter of the present disclosure. In many cases, two or more of such gas spring and damper assemblies in accordance with the subject matter of the present disclosure may be used. Additionally, in some cases, one or more springs (e.g., gas spring assemblies, coil spring assemblies, torsion bar assemblies) and one or more dampers (e.g., conventional shock absorbers or struts) can, optionally, be provided as separate components.

In the arrangement shown in FIG. 1, suspension system 100 includes four gas spring and damper assemblies 102, one of which is disposed toward each corner of the associated vehicle adjacent a corresponding wheel WHL. However, it will be appreciated that any other suitable number of gas spring and damper assemblies could alternately be used in any other configuration and/or arrangement, such as has been discussed above, for example. As shown in FIG. 1, gas spring and damper assemblies 102 are supported between axles AXL and body BDY of associated vehicle VHC, and include a gas spring 104 and a damper 106. It will be recognized that gas springs 104 are shown and described in connection with FIG. 1 as being of a rolling lobe-type construction. It is to be understood, however, that gas spring assemblies of other types, kinds and/or constructions could alternately be used without departing from the subject matter of the present disclosure.

Suspension system 100 also includes a pressurized gas system 108 operatively associated with the gas spring assemblies for selectively supplying pressurized gas (e.g., air) thereto and selectively transferring pressurized gas therefrom. In the exemplary embodiment shown in FIG. 1, pressurized gas system 108 includes a pressurized gas source, such as a compressor 110, for example, that is selectively operable to generate pressurized air or other gases. A control device, such as a valve assembly 112, for example, is shown as being in communication with compressor 110 and can be of any suitable configuration or arrangement. In the exemplary embodiment shown, valve assembly 112 includes a valve block 114 with a plurality of valves 116 supported thereon. Valve assembly 112 can also, optionally, include a suitable exhaust, such as a muffler 118, for example, for venting pressurized gas from the system. Optionally, pressurized gas system 108 can also include a reservoir 120 in fluid communication with the compressor and/or valve assembly 112 and suitable for storing pressurized gas.

Valve assembly 112 is in communication with gas springs 104 of assemblies 102 through suitable gas transfer lines 122. As such, pressurized gas can be selectively transferred into and/or out of the gas springs through valve assembly 112 by selectively operating valves 116, such as to alter or maintain a targeted distance or height at one or more corners of the vehicle, for example.

Suspension system 100 can also include a control system 124 that is capable of communication with any one or more systems and/or components (not shown) of vehicle VHC and/or suspension system 100, such as for selective operation and/or control thereof. Control system 124 can include a controller or electronic control unit (ECU) 126 communicatively coupled with compressor 110 and/or valve assembly 112, such as through a conductor or lead 128, for example, for selective operation and control thereof, which can include supplying and exhausting pressurized gas to and/or from gas spring and damper assemblies 102.

Control system 124 can also, optionally, include one or more height (or distance) sensing devices 130, such as, for example, may be operatively associated with the gas spring assemblies and capable of outputting or otherwise generating data, signals and/or other communications having a relation to a height of the gas spring assemblies or a distance between other components of the vehicle. Height sensing devices 130 can be in communication with ECU 126, which can receive the data, signals and/or information therefrom in relation to a height or distance. The height sensing devices can be in communication with ECU 126 in any suitable manner, such as through conductors or leads 132, for example. Additionally, it will be appreciated that the height sensing devices can be of any suitable type, kind and/or construction, such as may operate using sound, pressure, light and/or electromagnetic waves, for example.

Gas spring and damper assemblies in accordance with the subject matter of the present disclosure, such as assemblies 102, for example, can include one or more performance-variable bushings that can be selectively operated to vary one or more properties and/or characteristics (e.g., rigidity or stiffness) thereof. In such cases, the performance-variable bushings can include or can be otherwise operatively associated with one or more variation-inducing elements (not shown in FIG. 1) that can be selectively energized, actuated or otherwise operated to induce such variations in the one or more properties and/or characteristics of the performance-variable bushings. In the arrangement shown in FIG. 1, for example, gas spring and damper assemblies 102 are shown as including performance-variable bushings 134 operatively connected between gas springs 104 and dampers 106. Performance-variable bushings 134 can be communicatively coupled with control system 124 in any suitable manner, such as through leads or conductors 136, for example Furthermore, a suitable control system, such as control system 124, for example, can be utilized to operate the foregoing and other systems and/or components of the vehicle and/or the suspension system, each in a suitable manner. In some cases, such one or more systems and/or components could be under direct supervision and control by controller 124, as is illustrated in FIG. 1. Alternately, the control system could optionally include one or more electronic control units that are respectively associated with individual systems and/or components. Such one or more ECUs, if provided, can be in communication with the controller and at least partially supervise and/or control the respective components and/or systems with which the ECU or ECUs are associated.

A control system, such as control system 124, for example, can include a processing device, which can be of any suitable type, kind and/or configuration, such as a microprocessor, for example, for processing data, executing software routines/programs, and other functions relating to the performance and/or operation of the systems and/or components of the vehicle (e.g., suspension system 100). Additionally, the control system (e.g., control system 124) can include a storage device or memory, which can be of any suitable type, kind and/or configuration that can be used to store data, values, settings, parameters, inputs, software, algorithms, routines, programs and/or other information or content for any associated use or function, such as use in association with the performance and/or operation of the system and/or components of the vehicle and/or suspension system, and/or communication with a user or operator, for example.

In the embodiment shown in FIG. 1, controller 126 includes a microprocessor 138 and a storage device or memory, which is represented in FIG. 1 by boxes 140A and 140B. In the embodiment shown, one or more modules, such as may be described hereinafter, can be implemented as hardware, firmware and/or software, such as may be stored within memory 140A and/or 140B. Thus, microprocessor 138 can access memory stores 140A and 140B to retrieve and execute any one or more software modules, for example. Additionally, data, values, settings, parameters, inputs, software, algorithms, routines, programs and/or other information or content can also be retained within memory 140A and 140B for retrieval by microprocessor 138. It will be appreciated that such software routines can be individually executable routines or portions of a software program, such as an operating system, for example. Additionally, it will be appreciated that the control system, including any controller, processing device and/or memory, can take any suitable form, configuration and/or arrangement, and that the embodiments shown and described herein are merely exemplary. Furthermore, it is to be understood that the modules described hereinafter can be implemented in any suitable manner, including, without limitation, software implementations, firmware implementations, hardware implementations or any combination thereof.

As mentioned above, control system 124 can optionally include any suitable number of one or more modules capable of performing one or more functions and/or providing one or more features in accordance with the subject matter of the present disclosure. It will be appreciated that any such one or more modules can include or otherwise utilize any data, values, settings, parameters, inputs, software, algorithms, routines, programs and/or other information or content for any associated use or function, such as, for example, use in association with the performance and/or operation of the system and/or components of the vehicle and/or suspension system, and/or communication with a user or operator.

For example, control system 124 can include a height or distance-determining module 142A that is capable of receiving, processing, storing and/or otherwise transferring data, information, signals and/or communications relating to distances and/or heights of vehicle VHC, suspension system 100, gas spring and damper assemblies 102 and/or any other features and/or components thereof. As another example, control system 124 can include a pressure-determining module 142B that is capable of receiving, processing, storing and/or otherwise transferring data, information, signals and/or communications relating to the operation of pressurized gas system 108. As non-limiting examples, pressurized gas system 108 can include one or more pressure sensors (not shown) disposed in operative association with one or more of assemblies 102, compressor 110, valve assembly 112 and/or reservoir 120. Pressure-determining module 142B can be communicatively coupled with any such one or more sensors as well as with the one or more of assemblies 102, compressor 110, valve assembly 112 and/or reservoir 120. In such case, pressure determining module 142B can function to determine conditions associated with the gas pressure at or near any one or more of such systems and/or components, and/or to generate signals, data and/or information relating to the selective operation and/or control of any such one or more systems and/or components.

Additionally, in some cases, control system 124 can include an operating module 142C that is capable of receiving, processing, storing and/or otherwise transferring data, information, signals and/or communications relating to the operation of gas spring and damper assemblies 102. As a non-limiting example, operating module 142C could be communicatively coupled with one or more of modules 142A and 142B and/or one or more other systems, components and/or modules. In such case, operating module 142C can function to selective operate or otherwise control generation of pressurized gas within system 108 and/or can function to selectively transfer pressurized gas into and/or out of gas spring and damper assemblies 102, such as to selectively adjust a height or distance thereof, for example.

Control system 124 can include a dynamic control module 142D that is capable of receiving, processing, storing and/or otherwise transferring data, information, signals and/or communications relating to dynamic control and adjustment of systems and components of vehicle VHC and/or suspension system 100. Dynamic control module 142D can, for example, function to achieve a greater degree of ride quality and/or vehicle performance by selectively varying certain systems and/or components in response to dynamic inputs acting on the vehicle, such as from variations in road conditions, for example. As non-limiting examples, dynamic control module 142D can include features, performance characteristics and/or functions associated with active suspension system control techniques and/or adaptive (i.e., semi-active) suspension system control techniques.

Control system 124 can also include a performance-variation module 142E that is capable of receiving, processing, storing and/or otherwise transferring data, information, signals and/or communications relating to dynamic control and adjustment of performance-variable bushings 134. Performance-variation module 142E can be communicatively coupled with dynamic control module 142D, if provided, as well as with performance-variable bushings 134. In such cases, performance-variation module 142E can function to selectively induce or otherwise generate variations in the performance characteristics of bushings 134, such as may be responsive to signals, data and/or information from dynamic control module 142D. It will be appreciated that such performance-variation module 142E can function to selectively induce or otherwise generate such variations in the performance characteristics of bushings 134 in any suitable manner. For example, module 142E can, in one case, be disposed in direct communication with one or more variation-inducing elements (not shown in FIG. 1) for selective control thereof. In other cases, module 142E can be in communication with one or more intermediate systems and/or components (not shown) that can receive signals, data and/or information from module 142E, and generate corresponding electrical (or other, non-electrical) signals having increased properties and/or characteristics (e.g., increased voltage levels and/or increased current levels).

Furthermore, in some cases, control system 124 can include one or more other modules 142F of any suitable type, kind and/or functionality, such as may relate to the operation of other systems, components and/or features of the suspension system and/or vehicle.

Having described an example of a suspension system (e.g., suspension system 100) that can include a gas spring and damper assembly in accordance with the subject matter of the present disclosure (e.g., gas spring and damper assembly 102), one example of such a gas spring and damper assembly will now be described in connection with FIGS. 2-5. As shown therein, one example of a gas spring and damper assembly 200, such as may be suitable for use as a gas spring and damper assembly 102 in FIG. 1, for example, is shown as including a damper assembly 202 and a gas spring assembly 204 that is operatively connected with the damper assembly. It will be appreciated that, in use, gas spring and damper assembly 200 can undergo changes in length (i.e., can be displaced between extended and collapsed conditions) as a suspension system within which one or more assemblies are installed dynamically moves to accommodate forces and/or inputs acting on the vehicle.

Gas spring and damper assembly 200 is shown in FIGS. 2-5 as having a longitudinally-extending axis AX with damper assembly 202 and gas spring assembly 204 operatively secured to one another around and along axis AX. Damper assembly 202 is shown in FIGS. 2-5 as extending along axis AX and including a damper housing 206 and a damper rod assembly 208 that is at least partially received in the damper housing. As identified in FIG. 3, damper housing 206 extends axially between opposing housing ends 210 and 212, and includes a housing wall 214 that at least partially defines a damping chamber 216. Damper rod assembly 208 extends lengthwise between opposing ends 218 and 220 and includes an elongated damper rod 222 and a damper piston 224 disposed along end 220 of damper rod assembly 208. Damper piston 224 is received within damping chamber 216 of damper housing 206 for reciprocal movement along the housing wall in a conventional manner. A quantity of damping fluid (not shown) can be disposed within damping chamber and damper piston 224 can be displaced through the damping fluid to dissipate kinetic energy acting on gas spring and damper assembly 200. Though damper assembly 202 is shown and described herein as having a conventional construction in which a hydraulic fluid is contained within at least a portion of damping chamber 216, it will be recognized and appreciated that dampers of other types, kinds and/or constructions, such as pressurized gas or "air" dampers, for example, could be used without departing from the subject matter of the present disclosure.

Figure 3:
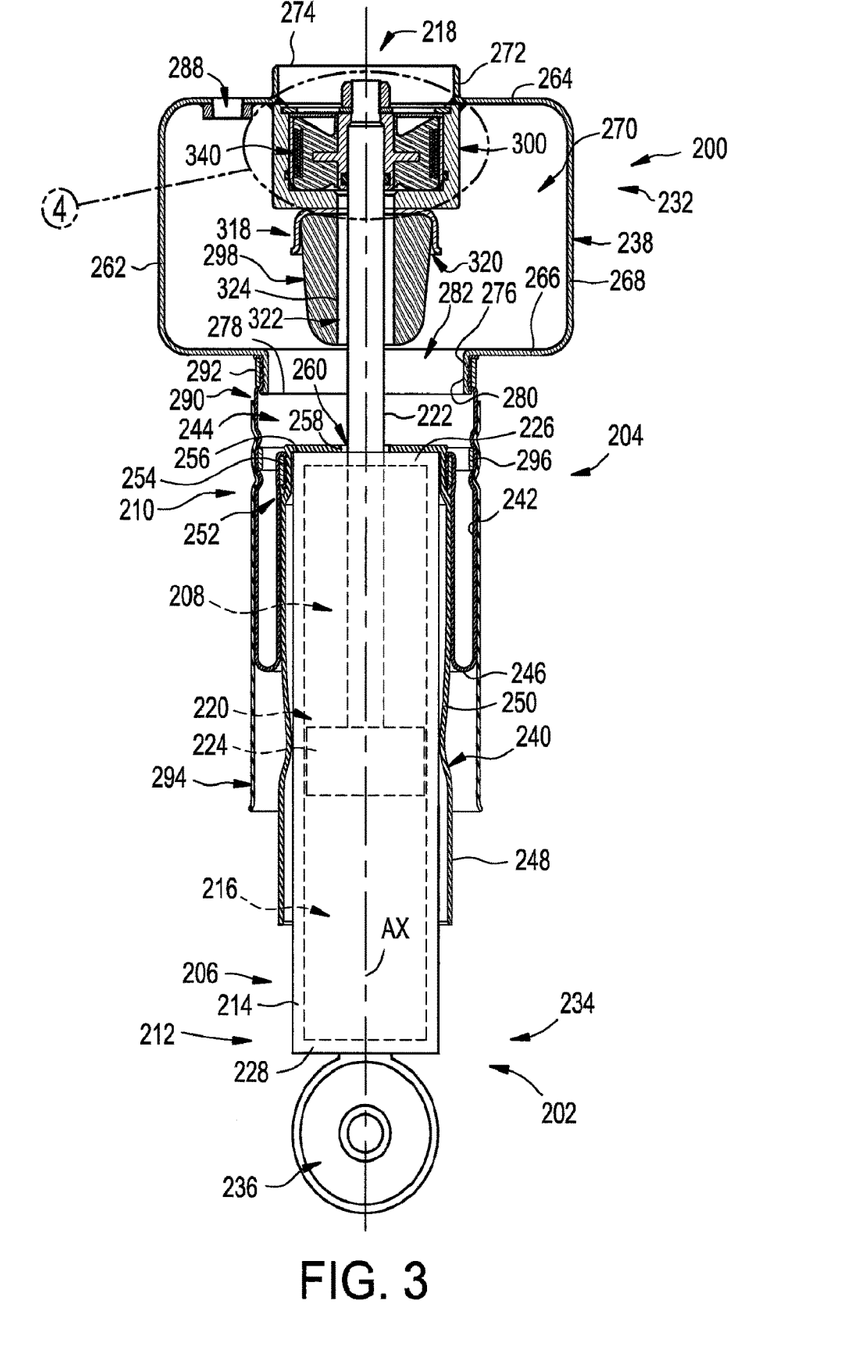
FIG. 3 is a cross-sectional side view of the gas spring and damper in FIG. 2 taken from along line 3-3 therein.

Housing wall 214 can form an opening (not shown) along housing end 210. A damper end wall 226 can extend across the opening and can be secured on or along housing wall 214 such that a substantially fluid-tight connection is formed therebetween. Damper end wall 226 can include an opening (not identified) and elongated damper rod 222 can extend axially-outwardly from damping chamber 212 through the opening in a direction opposite housing end 212. Additionally, a damper end wall 228 can be connected across end 212 of damper housing 206 such that a substantially fluid-tight connection is formed therebetween.

Elongated rod 222 projects outwardly from damper end wall 226 such that end 218 of the elongated rod is outwardly exposed from the damper housing and is externally accessible with respect to the damper housing. A connection feature 230, such as a plurality of threads, for example, can be provided on or along the elongated rod for use in operatively connecting damper assembly 202 to an associated vehicle structure, a component of gas spring assembly 204 or another component of gas spring and damper assembly 200, such as is shown in FIGS. 2-5, for example.

Figure 2:
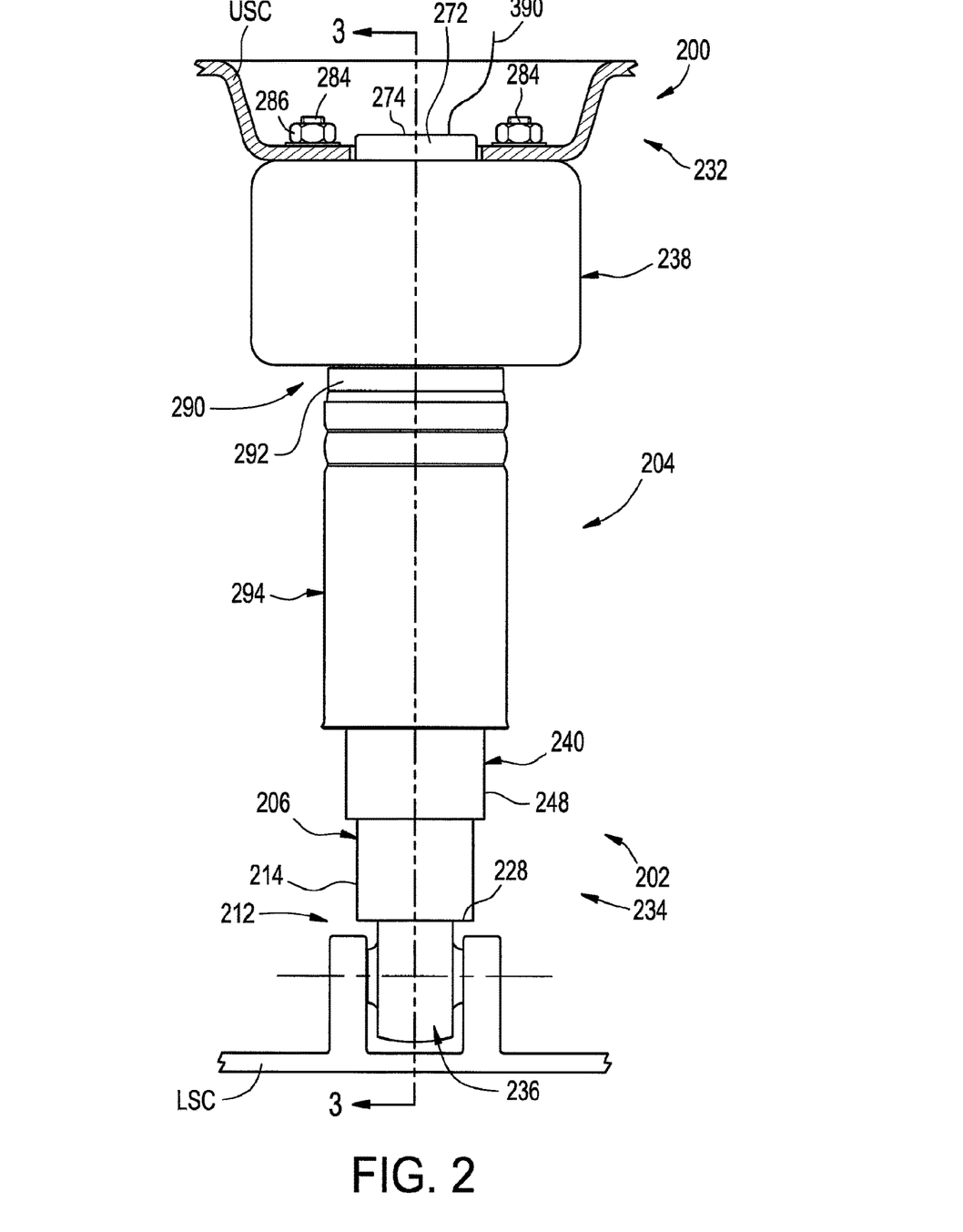
FIG. 2 is a side elevation view of one example of a gas spring and damper assembly in accordance with the subject matter of the present disclosure.

It will be appreciated that gas spring and damper assembly 200 can be operatively connected between associated sprung and unsprung masses of an associated vehicle (or other construction) in any suitable manner. For example, one end of the assembly can be operatively connected to the associated sprung mass with the other end of the assembly disposed toward and operatively connected to the associated unsprung mass. As shown in FIG. 2, for example, a first or upper end 232 of assembly 200 can be secured on or along a first or upper structural component USC, such as associated vehicle body BDY in FIG. 1, for example, and can be secured thereon in any suitable manner. A second or lower end 234 of assembly 200 can be secured on or along a second or lower structural component LSC, such as associated vehicle body BDY in FIG. 1, for example, and can be secured thereon in any suitable manner. For example, end 212 of damper housing 206 of the damper assembly can be operatively connected to lower structural component LSC and can be secured thereto in any suitable manner. As one example, damper assembly 202 can include a connection feature 236, such as a pivot or bearing mount, for example, that is operatively disposed along damper housing 206 and is adapted for securement to lower structural component LSC in a suitable manner.

Gas spring assembly 204 includes an end member 238, such as a top cap, bead plate or reservoir enclosure, for example. Gas spring assembly 204 also includes an end member 240, such as a roll-off piston or piston assembly, for example, that is disposed in axially-spaced relation to end member 238. A flexible spring member, such as an elongated flexible wall or sleeve 242, for example, can be operatively connected between end members 238 and 240 in a substantially fluid-tight manner such that a spring chamber 244 is at least partially defined therebetween. In some cases, flexible sleeve 242 can form a rolling lobe 246 that is displaced along an outer surface 248 of end member 240 as gas spring and damper assembly 200 moves between extended and compressed conditions.

As identified in FIG. 3, end member 240 can include a wall portion 250 along which an end 252 of flexible sleeve 242 is operatively connected, such as, for example, through the use of a retaining ring 254, for example, that can be crimped radially-inward or otherwise deformed to form a substantially fluid-tight connection therebetween. End member 240 can also include a wall portion 256 that projects radially-inward from wall portion 250. In some cases, end member 240 can be fit over or otherwise receive at least a portion of damper housing 206 such that wall portion 256 engages damper end wall 226 of the damper housing, such as to support the end member on the damper housing. A passage wall 258 at least partially defines a passage 260 that extends through end member 240 and is dimensioned to permit elongated rod 222 to pass therethrough. In such case, elongated rod 222 can slidably translate into and out of the gas spring assembly through end member 236.

As mentioned above, end member 238 can be of any suitable type, kind and/or construction, such as a top cap, bead plate or reservoir enclosure, for example. Additionally, it will be appreciated that end member 238 can be formed from any suitable material or combination of materials, and can include any suitable number or combination of one or more walls and/or wall portions. In the arrangement shown in FIGS. 2-4, for example, end member 238 can include an end member wall 262 that includes end wall portions 264 and 266 disposed in axially-spaced relation to one another and oriented transverse to axis AX. An outer side wall portion 268 can extend between end wall portions 264 and 266 such that the outer side wall portion and the end wall portions at least partially define a reservoir chamber 270 within end member 238. End member wall 262 can also include an inner side wall portion 272 that extends axially from along end wall portion 264 toward a distal edge 274. End member wall 262 can further include a mounting wall portion 276 that extends axially from along end wall portion 266 toward a distal edge 278. In a preferred arrangement, mounting wall portion 276 can include an inner surface 280 that at least partially defines an opening or passage 282 through which reservoir chamber 270 can fluidically communicate with spring chamber 244.

As discussed above, gas spring and damper assembly 200 can be operatively connected between associated sprung and unsprung masses of an associated vehicle (or other structure) in any suitable manner. As shown in FIG. 2, for example, first end 232 of assembly 200 can be secured on or along upper structural component USC in any suitable manner. As one example, one or more securement devices, such as mounting studs 284, for example, can be included along end member 238. In some cases, the one or more securement devices (e.g., mounting studs 284) can project outwardly from end member wall 262 and can be secured thereon in a suitable manner, such as, for example, by way of a flowed-material joint (not shown) or a press-fit connection (not identified). Additionally, such one or more securement devices can extend through mounting holes (not shown) in upper structural component USC and can receive one or more threaded nuts 286 or other securement devices, for example. Additionally, or as an alternative to the one or more of mounting studs, one or more threaded passages (e.g., blind passages and/or through passages) could be used in conjunction with a corresponding number of one or more threaded fasteners.

Gas spring assembly 204 can include a fluid communication port in fluid communication with spring chamber 244, such as may be used for transferring pressurized gas into and/or out of the gas spring assembly, for example. It will be appreciated that such a fluid communication port can be provided in any suitable manner. As one example, a fluid communication port could extend through one or more of the mounting studs. As another example, end member 238 can include a transfer passage 288 extending through end wall portion 264 of end member wall 262. Transfer passage 288 can be in fluid communication with reservoir chamber 270 and spring chamber 244 by way of passage 282. It will be appreciated, however, that any other suitable fluid communication arrangement could alternately be used. In some cases, passage 288 can be adapted to receive a suitable connector fitting (not shown), such as may be suitable for operatively connecting gas transfer lines 122 (FIG. 1) to the gas spring and damper assembly.

An end 290 of flexible sleeve 242 can be secured on or along end member 238 in any suitable manner. As one example, a portion of the flexible wall can be disposed in abutting engagement along an outer surface (not numbered) of mounting wall portion 276 of end member wall 262 and secured thereto in any suitable manner, such as, for example, by way of a retaining ring 292 that can be crimped radially inwardly or otherwise deformed to form a substantially fluid-tight connection along the mounting wall portion. Additionally, gas spring and damper assembly 200 can, optionally, include an external sleeve or support, such as a restraining cylinder 294, for example, that can be secured on or along the flexible sleeve in any suitable manner. As one example, a portion of the flexible sleeve can be secured in abutting engagement along a wall portion of restraining cylinder 294 by way of a retaining ring 296 that can be crimped radially outward or otherwise deformed to form engagement between the restraining cylinder and the flexible sleeve. It will be appreciated, however, that other arrangements could alternately be used.

Gas spring and damper assembly 200 can also, optionally, include one or more additional components and/or features. For example, a jounce bumper 298 can be disposed within spring chamber 244 and can be supported on or along one of end members 238 and 240 in a suitable manner. In the arrangement shown in FIGS. 2-5, jounce bumper 298 is received along elongated rod 222 and supported on end member 238. It will be appreciated, however, that other configurations and/or arrangements could alternately be used.

As mentioned above, end member 238 can include any suitable number or combination of one or more walls and/or wall portions. In the arrangement shown in FIGS. 2-5, for example, end member 238 includes a mounting cup 300 that can be supported on or along end member wall 262 in any suitable manner, such as by way of one or more flowed-material joints 302, for example. Mounting cup 300 can include a mounting cup wall 304 that can include a side wall portion 306 that extends in a generally axial direction from an edge wall 308 disposed toward end wall portion 264 to a distal end 310 disposed toward end wall portion 266 of end member wall 262. An end wall portion 312 can be disposed along distal end 310 and can extend radially inward from side wall portion 306 toward an inner peripheral edge 314 that at least partially defines a passage or opening 316 through end member 238. In a preferred arrangement, opening 316 is dimensioned to receive elongated rod 222 therethrough for operative connection with end member 238, such as is discussed below, for example.

In some cases, mounting cup wall 304 of mounting cup 300 can include an outer side wall portion 318 that can project from end wall portion 312 in a direction away from side wall portion 306 to at least partially define a recess or cavity 320 (FIG. 3) dimensioned to receive at least a portion of jounce bumper 298, if included, which can be secured on or along the end member in any suitable manner, such as by way of a press-fit connection with the inner side wall portion, for example. Additionally, in some cases, an opening, gap or other clearance 322 (FIG. 3) can be maintained between elongated rod 222 and an inner surface 324 of jounce bumper 298.

Figure 4:
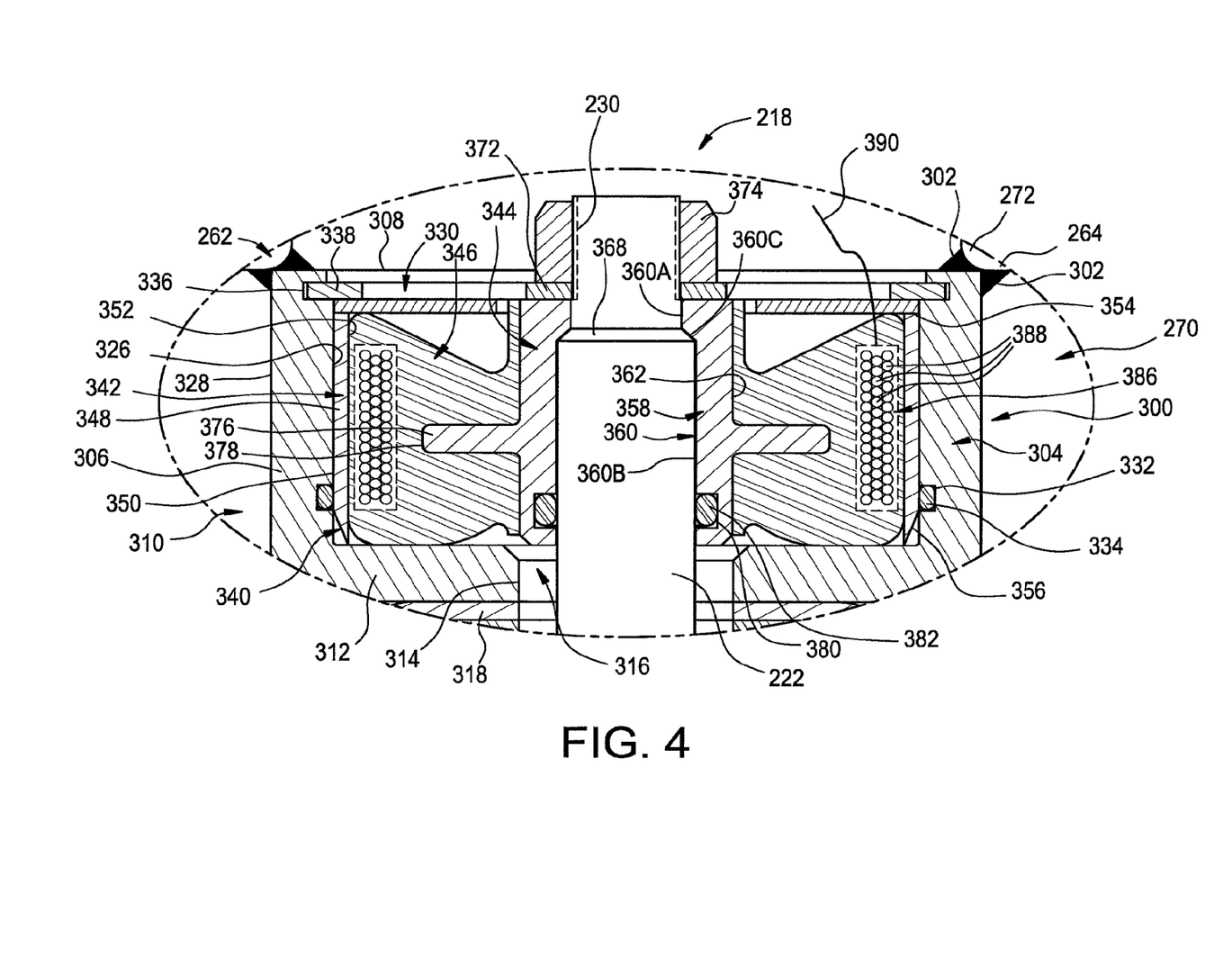
FIG. 4 is an enlarged cross-sectional view of the portion of the gas spring and damper assembly identified in Detail 4 of FIG. 3.
Figure 5:
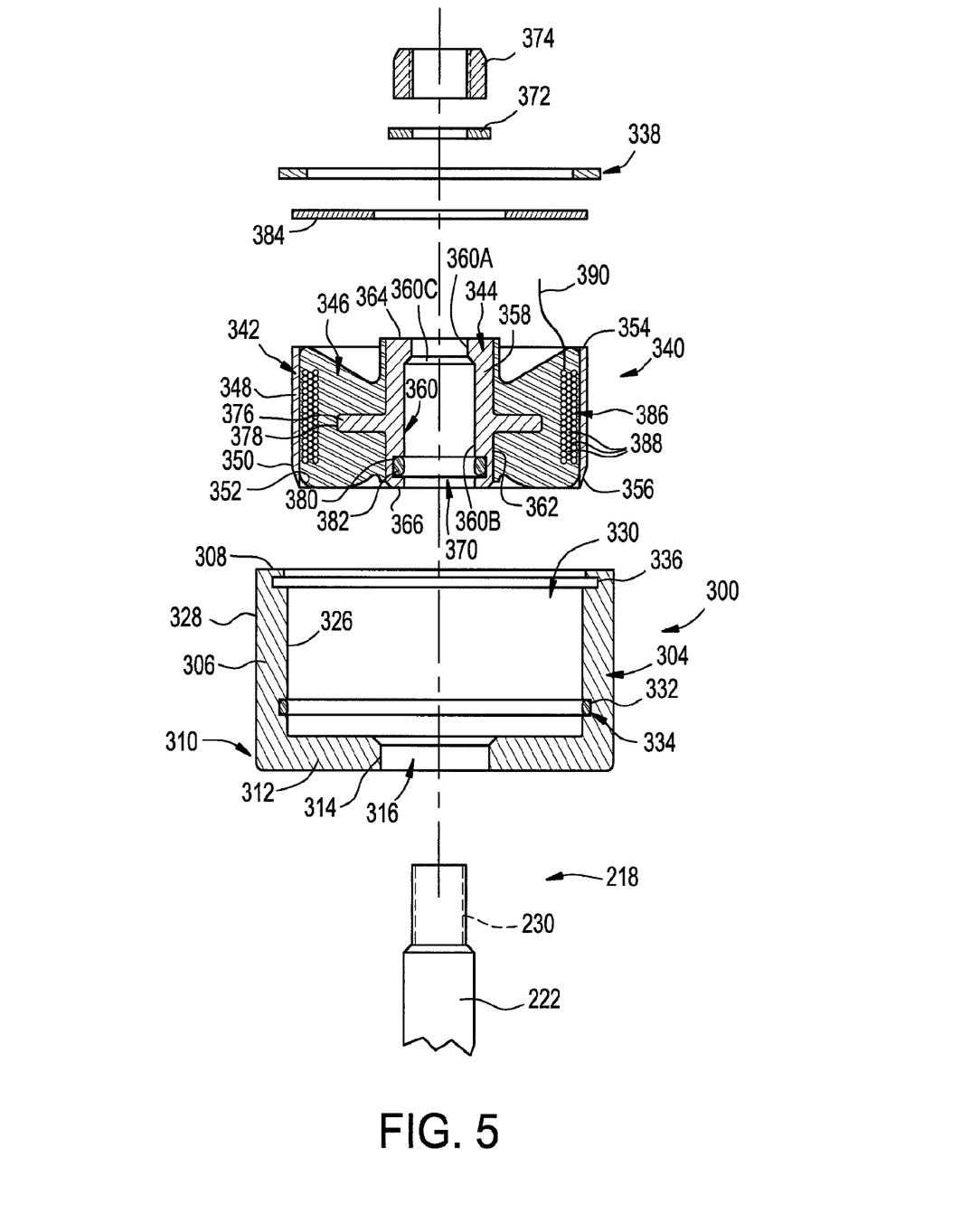
FIG. 5 is an exploded view of the portion of the gas spring and damper assembly shown in FIG. 4.

Side wall portion 306 is shown in FIGS. 3-5 as including an inside surface 326 and an outside surface 328. Inside surface 326 together with end wall portion 312 can at least partially define a cavity or chamber 330 disposed along end wall portion 312 opposite cavity 320. Cavity 330 can have an open end (not numbered) facing toward end wall portion 264 and/or inner side wall portion 272. An annular groove 332 can extend radially into side wall portion 306 from along inside surface 326 and can be dimensioned to receive a sealing element 334, such as an O-ring, for example. Additionally, or in the alternative, an annular groove 336 can extend radially into outer side wall portion 306 from along inside surface 326 and can be dimensioned to at least partially receive a retaining ring 338 or other suitable securement device, for example.

Gas spring and damper assembly 200 can also include a performance-variable bushing or bushing assembly 340, which may be also referred to in some cases as a damper rod bushing. Bushing assembly 340 can be operatively connected between elongated rod 222 of damper assembly 202 and end member 238 of gas spring assembly 204 in any suitable manner. In such case, forces acting on one of damper rod 222 and end member 238 that are experienced during use of the gas spring and damper assembly are transmitted or otherwise communicated through bushing assembly 340 to the other of damper rod 222 and end member 238.

What's more, a performance-variable bushing assembly in accordance with the subject matter of the present disclosure, such as bushing assembly 340, for example, is constructed to provide desired performance and operating characteristics while experiencing direct exposure to pressurized gas from spring chamber 244 and/or reservoir chamber 270. That is, a performance-variable bushing assembly in accordance with the subject matter of the present disclosure, such as bushing assembly 340, for example, is configured to provide desired performance and operating characteristics while experiencing pre-load forces associated with exposure to the pressurized gas within the spring chamber of the gas spring assembly. In this and other respects, performance-variable bushing assemblies in accordance with the subject matter of the present disclosure differ from conventional constructions, which are typically constructed for use with a seal assembly interposed between the bushing assembly and the spring chamber to fluidically isolate the bushing assembly from such gas pressure-induced pre-load forces.

Performance-variable bushing assembly 340 is shown in FIGS. 3-5 as including an outer support element 342, which may sometimes be referred to in the art as an outer metal, and an inner support element 344, which may sometimes be referred to in the art as an inner metal. Bushing assembly 340 also includes an elastomeric connector element 346 that is permanently attached (i.e., inseparable without damage, destruction or material alteration of at least one of the component parts) between outer and inner support elements 342 and 344. Additionally, in such a construction, elastomeric connector element 346 forms a substantially fluid-tight seal between outer and inner support elements 342 and 344. It will be appreciated that such substantially fluid-tight joints or connections can be formed by way of one or more processes and/or can include the use of one or more treatments and/or materials. Non-limiting examples of suitable processes can include molding, adhering, curing and/or vulcanizing.

Outer support element 342 can include an element wall 348 that can be formed from a comparatively rigid material with respect to the material of elastomeric connector element 346. Element wall 348 can have an outside surface 350 dimensioned for receipt within cavity 330 and an inside surface 352 to which elastomeric connector element 346 can be permanently attached. Element wall 348 can extend in a generally axial direction between a first edge 354 and an opposing second edge 356. In some cases, one of the edges (e.g., second edge 356) can have a frustoconical or otherwise tapered surface, such as may promote assembly or provide other benefits or uses. In a preferred arrangement, outside surface 350 of element wall 348 can have an approximately cylindrical shape and can be dimensioned to form a light press-fit with inside surface 326 of side wall portion 306. It will be appreciated that outer support element 342 can be secured on or along end member 238 in any suitable manner. As one example, retaining ring 338 (or together with one or more another components) can, in an installed condition, be dimensioned to project radially outward from groove 336 along inside surface 326 of side wall portion 306 a distance sufficient to overlap at least a portion of the outer support element and thereby inhibit axial displacement of outer support element 342.

Inner support element 344 can include an element wall 358 that can be formed from a comparatively rigid material with respect to the material of elastomeric connector element 346. Element wall 358 can have an inside surface 360, an outside surface 362 and can extend axially between opposing first and second end surfaces or edges 364 and 366. It will be appreciated that inner support element 344 can be operatively attached to elongated rod 222 in any suitable manner. As one example, inside surface 360 can be dimensioned to receive a portion of elongated rod 222 such that the inner support element and the elongated rod can be secured together in a suitable manner. In the arrangement shown in FIGS. 3-5, inside surface 360 has a first surface portion 360A with a first cross-sectional dimension, a second surface portion 360B with a second cross-sectional dimension that is greater than the first cross-sectional dimension of the first surface portion such that a shoulder surface portion 360C extends between and connects first and second surface portions 360A and 360B.

Damper rod 222 can include a shoulder surface 368 dimensioned to cooperate with shoulder surface portion 360C. The damper rod can be received within a passage 370 formed through inner support element 344 by inside surface 360 such that shoulder surface portion 360C and shoulder surface 368 are in abutting engagement with one another. Inner support element 344 can be captured or otherwise secured on or along damper rod 222 by way of one or more securement features and/or components, such as a washer 372 and threaded nut 374, for example, engaging corresponding securement or connection features 230 (e.g., one or more helical threads) on or along the damper rod. In this manner, damper rod 222 and inner support element 344 can be secured to one another.

Inner support element 344 includes outside surface 362 to which to which elastomeric connector element 346 can be permanently attached. Additionally, inner support element 244 can include a flange wall portion 376 that projects radially outward from outside surface 362 toward an outer peripheral edge 378. Flange wall portion 376 is disposed in spaced relation to each of end surfaces 364 and 366 such that elastomeric connector element 346 is permanently attached to portions of outside surface 362 along both sides of flange wall portion 376. As such, it will be recognized and appreciated that flange wall portion 376 is shown in the exemplary arrangement as being substantially-entirely embedded within elastomeric connector element 346.

As discussed above, the permanent attachment of elastomeric connector element 346 to outer and inner support elements 342 and 344 forms a substantially fluid-tight seal across bushing assembly 340. In that the elastomeric bushing assembly is exposed during use to pressurized gas contained within spring chamber 244 and/or reservoir chamber 270 of gas spring assembly 204, it may be desirable to inhibit or at least minimize or reduce pressurized gas loss around bushing assembly 340. As such, sealing element 334 can form a substantially fluid-tight seal between end member 238 and outer support element 342. Additionally, inner support element 344 can include an annular groove 380 that can extend radially into element wall 358 from along inside surface 360 and can be dimensioned to receive a sealing element 382, such as an O-ring, for example. In such case, sealing element 382 can form a substantially fluid-tight seal between damper rod 222 and inner support element 344.

During use in an installed condition of performance-variable bushing assembly 340, it will be appreciated that a portion of elastomeric connector element 346 may, in some cases, be disposed in abutting engagement with end wall portion 312 of end member 238. Additionally, it may, in some cases, be desirable to include a support wall along the end of the bushing assembly opposite end wall portion 312. In such cases, bushing assembly 340 can include an end plate or end wall portion 384 that can be supported or otherwise provided on or along one or more components of the bushing assembly in any suitable manner. It will be appreciated that end plate 384 can be formed from one or more portions of an existing component (e.g., outer support element 342) or provided as a separate component, such as is shown in FIGS. 3-5, for example.

As discussed above, a performance-variable bushing assembly in accordance with the subject matter of the present disclosure is capable of being selectively influenced such that values of one or more physical properties (e.g., material rigidity or stiffness) of the elastomeric connector element thereof can be varied within predetermined ranges of values. It will be appreciated that elastomeric connector elements of any suitable type, kind, configuration and/or construction can be used, and can include any suitable elastomeric material or combination of elastomeric materials. Non-limiting examples of suitable elastomeric materials can include electrorheological elastomeric materials and/or magnetorheological elastomeric materials.

The foregoing, non-limiting examples of suitable materials are be capable of undergoing selective variation one or more physical properties under the influence of a variation-inducing element, which can be selectively energized, actuated or otherwise operated to induce such variations. A non-limiting example of physical properties that can be selectively varied can include Young's modulus, which can be considered a measure of rigidity or stiffness of elastomeric materials.

One or more variation-inducing elements of a suitable type, kind and construction can be operatively associated with a performance-variable bushing assembly in accordance with the subject matter of the present disclosure. Such one or more variation-inducing elements can be operative to selectively influence or otherwise induce such variations in the elastomeric connector element. It will be appreciated that such one or more variation-inducing elements can be provided and operatively associated with the elastomeric connector element in any suitable manner. For example, the variation-inducing elements can be provided as components of the control system and can be mounted or otherwise installed in proximal relation to associated elastomeric connector elements. As another example, variation-inducing elements can be formed or otherwise provided as components of the performance-variable bushing assembly.

In the exemplary arrangement shown in FIGS. 3-5, performance-variable bushing assembly 340 includes a variation-inducing element 386 that is operatively associated with elastomeric connector element 346 for selectively varying one or more physical properties (e.g., material rigidity or stiffness) of the elastomeric connector element. It will be appreciated that, in a preferred arrangement, variation-inducing elements of a type, kind and/or construction can be used that correspond to the type and/or kind of elastomeric material from which elastomeric connector element 346 is formed. As a non-limiting example, elastomeric connector element 346 can be at least partially formed from an electrorheological elastomeric material that is capable of varying one or more physical properties and/or characteristics under the influence of an electrical field. In such case, variation-inducing element 386 can generate and apply a suitable electric field to elastomeric connector element 346 in any suitable manner. As another non-limiting example, elastomeric connector element 346 can be at least partially formed from an magnetorheological elastomeric material that is capable of varying one or more physical properties and/or characteristics under the influence of a magnetic field. In such case, variation-inducing element 386 can generate and apply a suitable magnetic field to elastomeric connector element 346 in any suitable manner.

In a preferred arrangement, variation-inducing element 386 can be communicatively coupled with a control system, such as control system 124 in FIG. 1, for example, in a suitable manner. In the arrangement shown in FIGS. 3-5, variation-inducing element 386 includes a plurality of helical coils of an electrical conductor 388 that can be communicatively coupled with a controller (e.g., controller 126) or other system of control system 124, such as through a conductor or lead 390, for example, for selective operation and control thereof.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, the term "gas" is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood that claims directed to any such combination of features and/or components, whether or not specifically embodied herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. A performance-variable bushing assembly dimensioned for securement between an end member of an associated gas spring assembly and a damper element of an associated damper assembly, said bushing assembly comprising:
   an inner support element including an element wall with an outside surface and inside surface at least partially defining a passage through said inner support element, said element wall including a flange wall portion extending outwardly from along said outside surface toward an outer peripheral edge;
   an outer support element spaced radially outward and coextensive with at least a portion of said inner support element;
   an elastomeric connecting element extending between and operatively connecting said inner and outer support elements such that a substantially fluid-tight seal is formed therebetween, said elastomeric connecting element at least partially formed from one of an electrorheological elastomeric material and a magnetorheological elastomeric material; and,
   a variation-inducing element operatively associated with at least said elastomeric connecting element and selectively operable to vary values of one or more physical properties within predetermined ranges of values corresponding to said one or more physical properties.

2. A performance-variable bushing assembly according to claim 1, wherein said elastomeric connecting element is configured for use under a pre-load force applied by pressurized gas within a spring chamber of said associated gas spring assembly.

3. A performance-variable bushing assembly according to claim 1, wherein said elastomeric connecting element is at least partially formed from an electrorheological elastomeric material, and said variation-inducing element is operative to generate and apply an electric field to said elastomeric connecting element.

4. A performance-variable bushing assembly according to claim 1, wherein said elastomeric connecting element is at least partially formed from a magnetorheological elastomeric material, and said variation-inducing element is operative to generate and apply a magnetic field to said elastomeric connecting element.

5. A performance-variable bushing assembly according to claim 1, wherein said elastomeric connecting element is permanently attached to said inner support element and said outer support element such that a substantially fluid-tight seal is formed therebetween.

6. A performance-variable bushing assembly according to claim 1, wherein said variation-inducing element is substantially-entirely embedded within said elastomeric connecting element.

7. A gas spring and damper assembly comprising:
   a gas spring assembly including:
      a first end member;
      a second end member that is disposed in spaced relation to said first end member such that a longitudinal axis extends therebetween; and,
      flexible spring member extending peripherally about said axis and including a flexible wall extending longitudinally between opposing first and second ends, said first end operatively attached to said first end member such that a substantially fluid-tight seal is formed therebetween, said second end operatively attached to said second end member such that a substantially fluid-tight seal is formed therebetween, said flexible spring member and said first and second end members at least partially defining a spring chamber of said gas spring assembly;
   a damper assembly operatively connected with said gas spring assembly, said damper assembly including:
      a damper housing; and,
      a damper rod assembly operatively connected with said damper housing such that said damper can generate reciprocal damping motion between said damper housing and said damper rod assembly and thereby dissipate kinetic energy acting on said gas spring and damper assembly; and,
   a performance-variable bushing assembly operatively connected between said damper rod assembly and said first end member of said gas spring assembly such that forces acting on one of said damper rod assembly and said first end member are communicated through said performance-variable bushing assembly to the other of said damper rod assembly and said first end member, said performance-variable bushing assembly being at least partially formed from one of an electrorheological elastomeric material and a magnetorheological elastomeric material that includes one or more physical properties that are variable under said influence of a corresponding one of an electric field and a magnetic field.

8. A gas spring and damper assembly according to claim 7, wherein said performance-variable bushing assembly is disposed in fluid communication with said spring chamber such that pre-load forces due to gas pressure within said spring chamber act on said performance-variable bushing.

9. A gas spring and damper assembly according to claim 7, wherein said performance-variable bushing assembly includes:
   an inner support element including an element wall with an outside surface and inside surface at least partially defining a passage through said inner support element, said element wall including a flange wall portion extending outwardly from along said outside surface toward an outer peripheral edge;
   an outer support element spaced radially outward and coextensive with at least a portion of said inner support element;
   an elastomeric connecting element extending between and operatively connecting said inner and outer support elements such that a substantially fluid-tight seal is formed therebetween, said elastomeric connecting element at least partially formed from one of said electrorheological elastomeric material and a magnetorheological elastomeric material; and,
   a variation-inducing element operatively associated with at least said elastomeric connecting element and selectively operable to vary values of one or more physical properties within predetermined ranges of values corresponding to said one or more physical properties.

10. A suspension system comprising:
    a pressurized gas system; and,
    at least one gas spring and damper assembly according to claim 7 with said spring chamber of said at least one gas spring and damper assembly disposed in fluid communication with said pressurized gas system such that pressurized gas can be transferred into and out of said spring chamber.

11. A suspension system according to claim 10 further comprising a control system including a controller communicatively coupled with one or more components of said pressurized gas system and configured for selective operation thereof.

12. A suspension system according to claim 10 further comprising:
    one or more variation-inducing elements cooperatively associated with said performance-variable bushing; and,
    a control system including a controller communicatively coupled with said one or more variation-inducing elements and configured for selective operation thereof to vary values of one or more physical properties of said one of said electrorheological elastomeric material and said magnetorheological elastomeric material within predetermined ranges of values corresponding to said one or more physical properties.

13. A suspension system according to claim 12 further comprising a height sensor operatively associated with said at least one gas spring and damper assembly and communicatively coupled with said controller, and wherein said controller includes a height-determining module operative to process data, information, signals and/or communications from said height sensor relating to distances associated with said at least one gas spring and damper assembly.

14. A suspension system according to claim 12 further comprising a pressure sensor operatively associated with said spring chamber of said at least one gas spring and damper assembly and communicatively coupled with said controller, and wherein said controller includes a pressure-determining module operative to process data, information, signals and/or communications from said pressure sensor for determining conditions associated with gas pressure at said at least one gas spring and damper assembly.

15. A suspension system according to claim 12, wherein said controller includes an operating module operative to selectively operate generation of pressurized gas and/or transfer of pressurized gas into and/or out of said at least one gas spring and damper assembly.

16. A suspension system according to claim 12, wherein said damper assembly of said at least one gas spring and damper assembly is operative to provide variable damping performance, and said controller includes a dynamic control module operative to selectively vary said damping performance of said damper assembly of said at least one gas spring and damper assembly.

17. A suspension system according to claim 12, wherein said controller includes a performance-variation module operative to selectively induce variations in said one or more variation-inducing elements associated with said performance-variable bushing.

\* \* \* \* \*